(12) United States Patent
Du

(10) Patent No.: US 11,662,050 B2
(45) Date of Patent: May 30, 2023

(54) SELF-ADAPTIVE INLINE INSPECTION VEHICLE FOR PIPELINES

(71) Applicant: Shuyong Paul Du, Plano, TX (US)

(72) Inventor: Shuyong Paul Du, Plano, TX (US)

( * ) Notice: Subject to any disclaimer, the term of this patent is extended or adjusted under 35 U.S.C. 154(b) by 571 days.

(21) Appl. No.: 16/812,176

(22) Filed: Mar. 6, 2020

(65) Prior Publication Data

US 2020/0208769 A1 Jul. 2, 2020

Related U.S. Application Data

(63) Continuation-in-part of application No. PCT/US2019/002543, filed on Apr. 2, 2019.
(Continued)

(30) Foreign Application Priority Data

| Sep. 30, 2019 | (CN) | ................. | 201910938724.3 |
| Sep. 30, 2019 | (CN) | ................. | 201921668357.1 |

(51) Int. Cl.
*F16L 55/28* (2006.01)
*F16L 55/36* (2006.01)
(Continued)

(52) U.S. Cl.
CPC ........... *F16L 55/28* (2013.01); *F16L 2101/30* (2013.01)

(58) Field of Classification Search
CPC ....... F16L 55/28; F16L 2101/30; F16L 55/36; F16L 55/44
See application file for complete search history.

(56) References Cited

U.S. PATENT DOCUMENTS

| 4,945,775 A | 8/1990 | Adams et al. |
| 2004/0217759 A1 | 11/2004 | Burkhardt et al. |
| | (Continued) | |

FOREIGN PATENT DOCUMENTS

| CN | 1886293 A | 12/2006 |
| CN | 101788093 A | 7/2010 |
| | (Continued) | |

OTHER PUBLICATIONS

Parfomak, Paul W., "Pipelines: Securing the Veins of the American Economy", Congressional Research Service 7-5700, Apr. 19, 2016, 14 pgs.
(Continued)

*Primary Examiner* — Herbert K Roberts
*Assistant Examiner* — Anthony W Megna Fuentes
(74) *Attorney, Agent, or Firm* — Jessica Smith; Loza & Loza, LLP

(57) ABSTRACT

An inline inspection vehicle includes an auto-adjustable, self-adaptive structure. The inline inspection vehicle includes a plurality of self-adjustable carrier racks carrying inspection device carts with positioning rollers, and self-adaptive driving turbine wheels at a front part and a back end for auto-adjustable driving speeds. The inline inspection vehicle also includes intelligent self-control mechanisms implemented using self-adaptive schema and algorithms for a finite set of control states to integrate the adaptive controller and actuators. Furthermore, it may conduct virtual pressure tests by carrying intelligent inline data acquisition devices to converge the Pipeline Integrity Management with SCADA monitoring system.

20 Claims, 23 Drawing Sheets

Related U.S. Application Data

(60) Provisional application No. 62/816,008, filed on Mar. 8, 2019, provisional application No. 62/651,520, filed on Apr. 2, 2018.

(51) Int. Cl.
*F16L 55/44* (2006.01)
*F16L 101/30* (2006.01)

(56) References Cited

U.S. PATENT DOCUMENTS

| | | | |
|---|---|---|---|
| 2006/0129338 A1 | 6/2006 | Turley et al. | |
| 2009/0101337 A1* | 4/2009 | Neidhardt | E21B 47/08 166/250.01 |
| 2009/0150094 A1 | 6/2009 | Van Velsor et al. | |
| 2014/0345366 A1* | 11/2014 | Mekid | G01M 3/246 73/40.5 R |
| 2016/0018044 A1 | 1/2016 | Farzam et al. | |

FOREIGN PATENT DOCUMENTS

| | | | | |
|---|---|---|---|---|
| CN | 202048304 U | | 11/2011 | |
| CN | 103727351 A | * | 4/2014 | F16L 55/32 |
| CN | 204979200 U | * | 1/2016 | B63H 3/00 |
| CN | 105402553 A | | 3/2016 | |
| CN | 108488539 A | | 9/2018 | |
| JP | 2017194125 A | | 10/2017 | |
| KR | 20120103869 A | * | 9/2012 | F16L 55/26 |
| KR | 101494784 B1 | * | 2/2015 | F16L 55/28 |
| KR | 20160110652 A | * | 9/2016 | F16L 55/32 |

OTHER PUBLICATIONS

Kowalewski, Rick A, "A Report to the Secretary of Transportation: Pipeline Integrity Management, an Evaluation to Help Improve PHMSA's Oversight of Performance-Based Pipeline Safety Programs", Oct. 31, 2013, 154 pgs.
Pipeline and Hazardous Materials Safety Administration, Pipeline Risk Modeling Overview of Methods and Tools for Improved Implementation, May 9, 2018, Draft 1, 111 pgs.
Process Performance Improvement Consultants, LLC , "Comparison of integrity management assessment techniques for natural gas transmission pipelines", Copyright ® 2007 by The INGAA Foundation, Inc., 55 pgs.
Trench, Cheryl J. et al."The role of energy pipelines and research in the united states—Sustaining the Viability and Productivity of a National Asset", Copyright © 2006, Pipeline Research Council International, Inc., 70 pgs.
Nat'l Transp Safety BD., NTSB/SS-05/02, Supervisory Control and Data Acquisition (SCADA) in Liquid Pipelines 1, 2, 3 (2005), available at http://pstrust.org/docs/SS0502.pdf, 108 pgs.

* cited by examiner

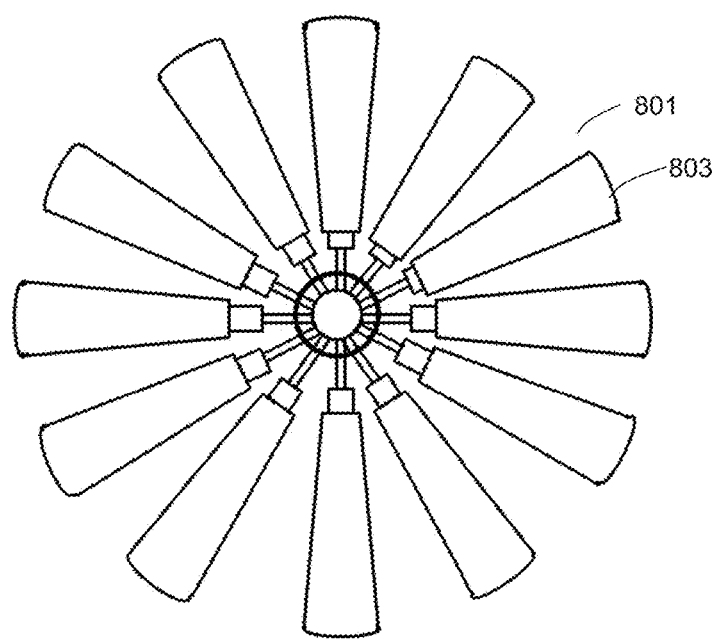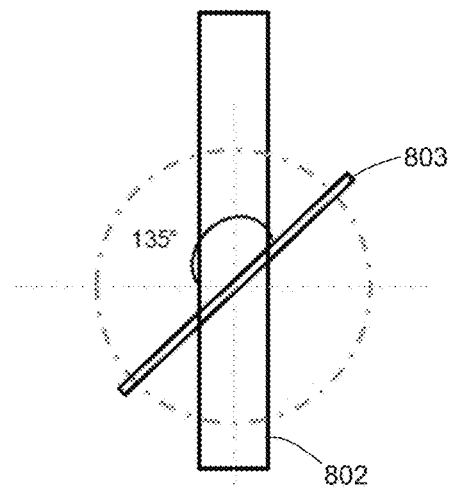
FIG. 8A
FIG. 8B

SELF-ADAPTIVE INLINE INSPECTION VEHICLE FOR PIPELINES

CROSS REFERENCE TO RELATED APPLICATIONS

The present application claims priority under 35 U.S.C. § 119 to U.S. Provisional Application No. 62/816,008 entitled, "A SELF-ADAPTIVE SYSTEM STRUCTURE AND METHOD FOR AN INLINE INSPECTION VEHICLE OF PIPELINES," filed Mar. 8, 2019, which is hereby expressly incorporated by reference herein.

The present application claims priority under 35 U.S.C. § 119(a) to Chinese Utility Model Application No. 201921668357.1 entitled, "INLINE INSPECTION VEHICLE FOR PIPELINES," filed Sep. 30, 2019, and hereby expressly incorporated by reference herein.

The present application claims priority under 35 U.S.C. § 119(a) to Chinese Patent Application No. 201910938724.3 entitled, "INLINE INSPECTION VEHICLE FOR PIPELINES," filed Sep. 30, 2019, and hereby expressly incorporated by reference herein.

The present application claims priority under 35 U.S.C. § 120 as a continuation in part application to PCT Application No. PCT/US2019/025438 entitled "Intelligent Data Acquisition System and Method for Pipelines" filed Apr. 2, 2019, which is hereby expressly incorporated by reference herein, which claims priority under 35 U.S.C. § 119 to U.S. Provisional Application No. 62/651,520 entitled, "Intelligent Data Acquisition System and Method for Pipelines," filed Apr. 2, 2018, which is hereby expressly incorporated by reference herein.

FIELD

This application relates to operation of a pipeline and a system and method for an inline inspection vehicle with self-adaptive structure.

BACKGROUND

Long distance pipelines transport products between cities, countries and even continents. Pipeline networks are widespread, running alternately through remote and densely populated regions. Nearly three million miles of pipeline transporting natural gas, oil, refined products and other hazardous liquids crisscross the United States. Pipelines transport nearly two-thirds of country's energy supply and convey flammable or explosive materials. Therefore, improving pipelines' safety and security is so critical for not only securing "the Veins of the American Economy" but also eliminating any potential chance of public injury, destruction of property, and environmental damage.

Pipeline failures are often the result of corrosion, equipment failure, manufacturing error, environmental incidents, and human interference. To detect and prevent pipe failures, operators and regulators conduct regular inspections. Inspections generally target typical pipeline vulnerabilities and defects including loss of coatings, corrosion, stress corrosion cracking (SCC), deformations, and circumferential and axial flaws.

Maintenance of pipelines includes checking cathodic protection levels for the proper range, surveillance for construction, erosion, or leaks by foot, land vehicle, boat, or air, and running cleaning pigs, when corrosive substances are carried in the pipeline.

Inline inspection or inspecting deepwater pipelines is complicated. Inspections can be lengthy and costly. When investigating potential defects, it is very hard and challengeable to collect the high-quality inspection data required to make accurate assessments. The common methods of inspection, which can be costly and time-consuming, often fail to generate the high-resolution data necessary for proper assessment of the pipeline.

Sophisticated and sensitive inline inspection (ILI) tools travel through the pipe and measure and record irregularities that may represent corrosion, cracks, laminations, deformations (dents, gouges, etc.), or other defects. Because they run inside the pipe in a manner similar to the scrubbing and scraping devices known as "pigs", these inline inspection tools are often referred to as "smart pigs". Although ultrasound testing has been applied to corrosion and crack detection, Electromagnetic Acoustic Transducer (EMAT) technology also involves the generation of ultrasonic acoustic waves in electrically and magnetically conductive materials by the combined interaction of magnetic fields together with a relatively high frequency (RF) field generated by electrical coils. Inline inspection technologies with Non-destructive testing (NDT) methods are mostly dominated by Magnetic flux leakage (MFL) testing for detecting corrosion manifest metal loss, as well as cracking.

A limitation of MFL inspection tools is a result of the structure of the MFL magnet configuration. The conventional MFL technique requires an array of powerful excitation magnets to magnetize a pipe wall to near saturation of magnetic flux density, most commonly oriented in a direction that is parallel to the longitudinal axis of the pipe. This requires magnets that are large and bulky in order to produce a magnetic field strong enough to approach magnetic flux saturation density. So it is difficult to implement a configuration of MFL excitation magnets that is sufficiently collapsible to enable an MFL inspection tool to traverse obstructions such as valves or curvatures within the pipeline. Because of these obstructions, it is not possible to inspect these encumbered pipelines with current MFL inspection tools.

Geometry tools detect, measure and locate changes in the internal cross section of a pipeline. They are typically used prior to inline inspection to ensure that the inline inspection instrument will pass safely through the pipeline and to collect data that helps in interpreting the information gathered by inline inspection tools. They are also used to inspect mechanical damage on the pipeline such as dents that may be caused by a third party striking the pipeline.

Pipeline obstacles such as dented pipes or obstructions and deformations may prevent inline inspection tools from traversing the entire length of a pipeline. Geometric constraints such as pipe curvature or valves may also prevent conventional inline inspection tools from passing through sections of the pipeline. Accordingly, the inline inspection tools may not be able to collect data concerning this particular section of pipeline. As a result, the pipeline operators may get an incomplete picture of the status of the pipeline. These blind spots may potentially contain flaws or defects in the pipeline and similar conditions that otherwise require maintenance or attention to ensure safe and efficient operation of the pipeline.

Therefore, it is a desire to provide an inline inspection tool with intelligent self-adaptive and auto-adjustable features so that the inline inspection tool can traverse through obstacles and geometric constraints and collect data for substantially the entire pipeline.

SUMMARY

According to one aspect, the inline inspection vehicle is configured for pipelines and includes a vehicle body; a plurality of carrier racks connected to the vehicle body and extending radially outward from the vehicle body; a plurality of inspection device carts, wherein a different one of the plurality of inspection device carts is attached radially at an outer end of each of the plurality of carrier racks; and a plurality of sensors coupled to each of the plurality of inspection device carts.

According to another aspect, the inline inspection vehicle comprises a front body, wherein the front body includes a front movable part and a front base part and a back body.

According to another aspect, the inline inspection vehicle includes a front turbine wheel and a steering axis coupled to the front body and the front turbine wheel, wherein an actuator controls a speed of the front turbine wheel. The inline inspection vehicle includes a back turbine wheel and a steering axis coupled to the back body and the back turbine wheel, wherein an actuator controls a speed of the back turbine wheel.

According to another aspect, each of the front turbine wheel and the back turbine wheel include a plurality of blades extending radially outward from an outer axis; a driving gear mounted on an inner axis; a driven gear mounted on a bottom of each of the plurality of blades. The driving gear and the driven gear has a meshing position, in which the rotation of the driving gear drives the driven gear to rotate, such that each of the plurality of blades rotate about its respective longitudinal axis.

According to another aspect, each of the plurality of carrier racks comprises a main strut, wherein a radial inner end of the main strut is connected to the vehicle body and a radial outer end of the main strut is connected to one of the plurality of inspection device carts; an auxiliary strut, wherein a radial inner end of the auxiliary strut is connected to the vehicle body and a radial outer end of the auxiliary strut is hinged to a middle position of the main strut; and wherein a lower end of at least one of the main strut and the auxiliary strut is configured to move in response to movement of the front movable part along a longitudinal direction.

According to another aspect, the vehicle body comprises an outer cylinder including the front base part; an inner cylinder including the front movable part, wherein at least a portion of the inner cylinder is configured to fit within the outer cylinder; and an actuator drive configured to move the inner cylinder forward or backward longitudinally within the outer cylinder to adjust a size of the plurality of carrier racks.

According to another aspect, each of the plurality of carrier racks comprises a main strut; an auxiliary strut; and a roller mounted at a lower end of at least one of one of the main strut or the auxiliary strut by a guiding track, wherein the roller is configured to move forward or backward longitudinally along the guiding track in response to movement of the inner cylinder.

According to another aspect, when the carrier rack is in a radially contracted state, the inner cylinder is extended relative to the outer cylinder, and when the carrier rack is in a radially extended state, the inner cylinder is retracted relative to the outer cylinder. When the carrier rack is in the radially contracted state, the roller that is mounted at the lower end of at least one of one of the main strut or the auxiliary strut is moved to a back position along the guiding track on the outer cylinder, and when the carrier rack is in the radially extended state, the roller that is mounted at the lower end of at least one of one of the main strut or the auxiliary strut is moved to the front position along the guiding track on the outer cylinder.

According to another aspect, the plurality of carrier racks connected to the vehicle body and extending radially outward from the vehicle body are circularly and evenly arranged around the vehicle body, and wherein two neighbored carrier racks of the plurality of carrier racks are in different configurations: a first neighbored carrier rack in a backward configuration and a second neighbored carrier rack in a forward configuration.

According to another aspect, when the first neighbored carrier rack in a backward configuration includes the lower end of its main strut hinged to the inner cylinder, and the roller is mounted at the lower end of the auxiliary strut, wherein the roller is moved backward and forward along the guiding track on the outer cylinder. When the second neighbored carrier rack in the forward configuration includes the lower end of its auxiliary strut is hinged to the inner cylinder, and the roller is mounted at the lower end of the main strut, wherein the roller is moved backward and forward along the guiding track on the outer cylinder.

According to another aspect, a head attached to the vehicle body and includes at least one of: advanced sensors or a digital radiographic camera or a guided wave ultrasonic testing (GWUT) device.

According to another aspect, one or more positioning rollers mounted on each of the plurality of inspection device carts, wherein the one or more positioning rollers are configured to interact with an inner wall of the pipelines for guidance of the inline inspection vehicle.

According to another aspect, each of the plurality of inspection carts include one or more sensors to detect one or more of: radial displacement, pressure, temperature, flows, and acoustics in the pipeline, and one or more devices for magnetic flux leakage (MFL) testing or ultrasound testing or electromagnetic acoustic transducer (EMAT).

According to another aspect, each of the plurality of blades of the front turbine wheel and the back turbine wheel comprise a vane; a middle part; and a supporting strut. When in a reduced size state, each of the plurality of blades is configured to incline clockwise approximately 1°-2° to abscissa, and the vane and middle part are configured to contract inward radially. When in a full size state, each of the plurality of blades is configured to extend outward with its vane and middle part extended outward radially.

According to another aspect, when in a fast speed state, the front turbine wheel and the back turbine wheel adjust to a dish shape; when in a slow speed state, each of the plurality of blades are configured to rotate clockwise to an acute degree to abscissa; when in a stop speed state, each of the plurality of blades are configured to rotate clockwise approximately 90° to approximately perpendicular to abscissa; and when in a backward state, each of the plurality of blades are configured to rotate clockwise to an obtuse degree to abscissa.

According to another aspect, the inline inspection vehicle includes an adaptive controller and a plurality of actuators, wherein the control system controls the plurality of actuators in response to an input of one or more sensors and configures the inline inspection vehicle to one of: the full size state or the reduced size state, and one of: the fast speed state, the slow speed state, the stop speed state, or the backward state.

BRIEF DESCRIPTION OF THE DRAWINGS

FIG. 8A and FIG. 8B illustrate a schematic block diagram of an example embodiment of the self-adaptive driving turbine wheel blades in a backward state.

DETAILED DESCRIPTION

Figure 1A:
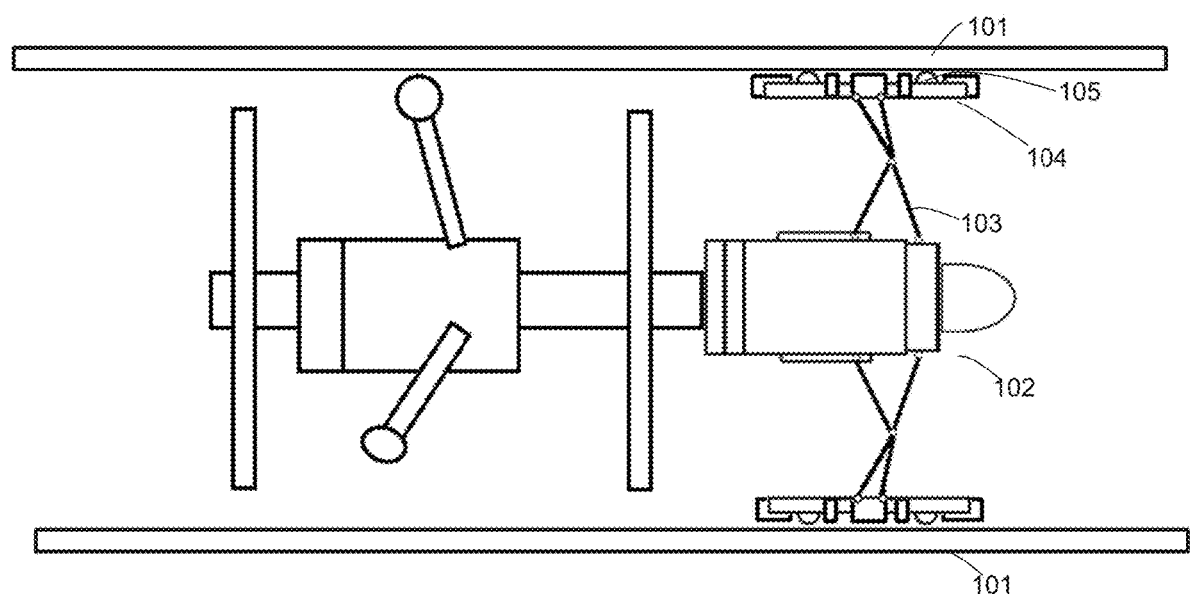
FIG. 1A illustrates a schematic block diagram of a side elevation of an embodiment of an inline inspection vehicle with self-adaptive system structure inside a pipeline.

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation. Obviously, self-propelled and auto-adjustable inline inspection vehicle may solve such challenges.

Embodiments will now be described in detail with reference to the accompanying drawings. In the following description, numerous specific details are set forth in order to provide an understanding of the aspects described herein. It will be apparent, however, to one skilled in the art, that these and other aspects may be practiced without some or all of these specific components or with alternate components. In addition, well known steps in a method of a process may be omitted presented herein in order not to obscure the aspects of the disclosure. Similarly, well known components in a device may be omitted from figures and descriptions thereof presented herein in order not to obscure the aspects of the disclosure.

The basic principles underlying the Integrity Management program are that pipeline operators should have a good understanding of their own systems, particularly the threats and risks, and should manage those risks in a systematic way. ASME B31.8S, "Managing System Integrity of Gas Pipelines" is the engineering standard created through the ANSI consensus standard process to manage natural gas transmission pipeline system integrity. B31.8S recognizes three assessment methodologies: Pressure Testing, In-line Inspection and Direct Assessment. In addition, the standard provides for "other" methodologies to be used provided they are proven to achieve the intended results. This encourages innovation, research and development as well as continual improvement.

The structural integrity of pipelines is conventionally determined by using inline inspection tools which measure the condition of the pipe walls with the remaining strength of the pipeline being calculated from a knowledge of the significance of metal loss, cracking or other defects found.

There are many technologies and physics principles which have been proposed or used for detecting and measuring the size of the defects. The magnetic flux leakage is of most use in measuring significant metal loss from the walls of both gas and liquid product pipelines. In contrast, ultrasound has its main application in measuring cracks in the pipe wall material, but is commonly limited to liquid product pipelines, because, for conventional ultrasound transducers, liquid is needed to conduct the ultrasound into the pipe walls. EMAT technology is one way of directly exciting ultrasound in the walls of the pipes and does not require a liquid to convey the sound from the transducer into the walls of the pipes.

However, all kinds of inline inspection tools are propelled by the pressure of the product in the pipeline itself currently; and inline inspection technologies based on magnetic flux leakage (MFL) testing, ultrasound testing, electromagnetic acoustic transducer (EMAT) are not a complement to the pipeline's SCADA systems.

PCT/US2019/025438 filed on Apr. 2, 2019 (U.S. Provisional Patent No. 62/651,520 filed on Apr. 2, 2018) entitled "Intelligent Data Acquisition System and Method for of Pipelines" tries to establish high-quality, high-accuracy continuous pressure, flow and temperature profiles along pipeline route. It introduces an inline robotic detector with intelligent self-adaptive and auto-adjustable features to collect more reliable data to be shared with SCADA systems for effectively improving leak prediction and detection, and determining leaking position accurately including tiny seepage leaking.

U.S. patent application Ser. No. 16/739,459 filed on Jan. 10, 2020 and entitled, "A Renewable Power System and Method for Pipeline Inspection Tools" tries to provide smart inline inspection tools with rechargeable power systems for self-propelled inline inspection tool and adaptive control.

One of the present embodiments is an inline inspection vehicle that comprises an auto-adjustable, self-adaptive structure and a self-propelled feature with a renewable and rechargeable power system. This inline inspection vehicle includes a plurality of self-adjustable carrier racks carrying inspection device carts with positioning rollers, and self-adaptive driving turbine wheels at a front part and a back end for auto-adjustable driving speeds. The inline inspection vehicle also includes intelligent self-control mechanisms implemented using self-adaptive schema and algorithms for a finite set of control states to integrate the adaptive controller and actuators. Furthermore, it may conduct virtual pressure tests by carrying intelligent inline data acquisition devices to converge the Pipeline Integrity Management with SCADA monitoring system.

The inline inspection vehicle provides a general purpose structure or platform that may be customized with different types of inline inspection tools of pipelines for non-destructive testing (NDT). For example, the inline inspection tools may include one or more of magnetic flux leakage (MFL) testing tools, ultrasound testing tools, electromagnetic acoustic transducer (EMAT), guided wave ultrasonic testing (GWUT) tools, and caliper in line tools, as well as Intelligent In line Data Acquisition Devices. Furthermore, it may conduct virtual pressure tests by carrying intelligent inline data acquisition devices to converge the Pipeline Integrity Management with SCADA monitoring system. This inline inspection vehicle with auto-adjustable and self-adaptive structure, self-propelled feature, and rechargeable power system may play a critical role in building an integrated inspection regime to integrate the major types of pipeline inspections into a more comprehensive, risk-based approach.

FIG. 1A illustrates a schematic block diagram of a side elevation of an embodiment of an inline inspection vehicle 102 with self-adaptive system structure inside a pipeline 101. The inspection vehicle 102 includes one or more carrier racks 103, inspection device carts 104 and positioning rollers 105.

Figure 1B:
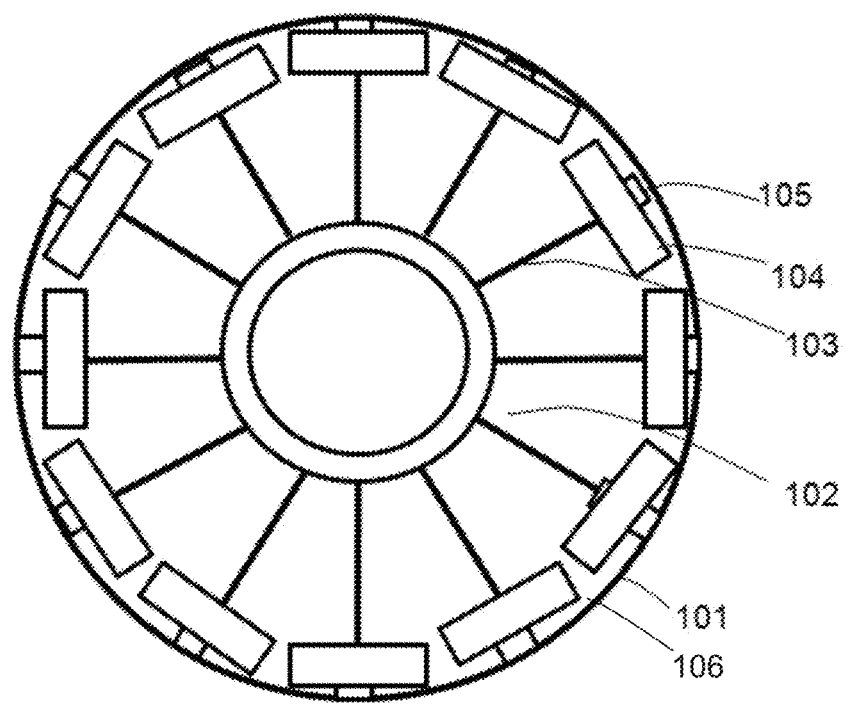
FIG. 1B illustrates a schematic block diagram of a front elevation of an embodiment of the inline inspection vehicle with self-adaptive system structure inside the pipeline.

FIG. 1B illustrates a schematic block diagram of a front elevation of an embodiment of the inline inspection vehicle 102 with self-adaptive system structure inside the pipeline 101. From the front view of the inspection vehicle 102, the positioning rollers 105 are configured in a radial direction to roll along the inner wall 106 of the pipeline 101. the one or more positioning rollers 105 are configured to interact with an inner wall of the pipelines for guidance of the inline inspection vehicle.

Figure 2:
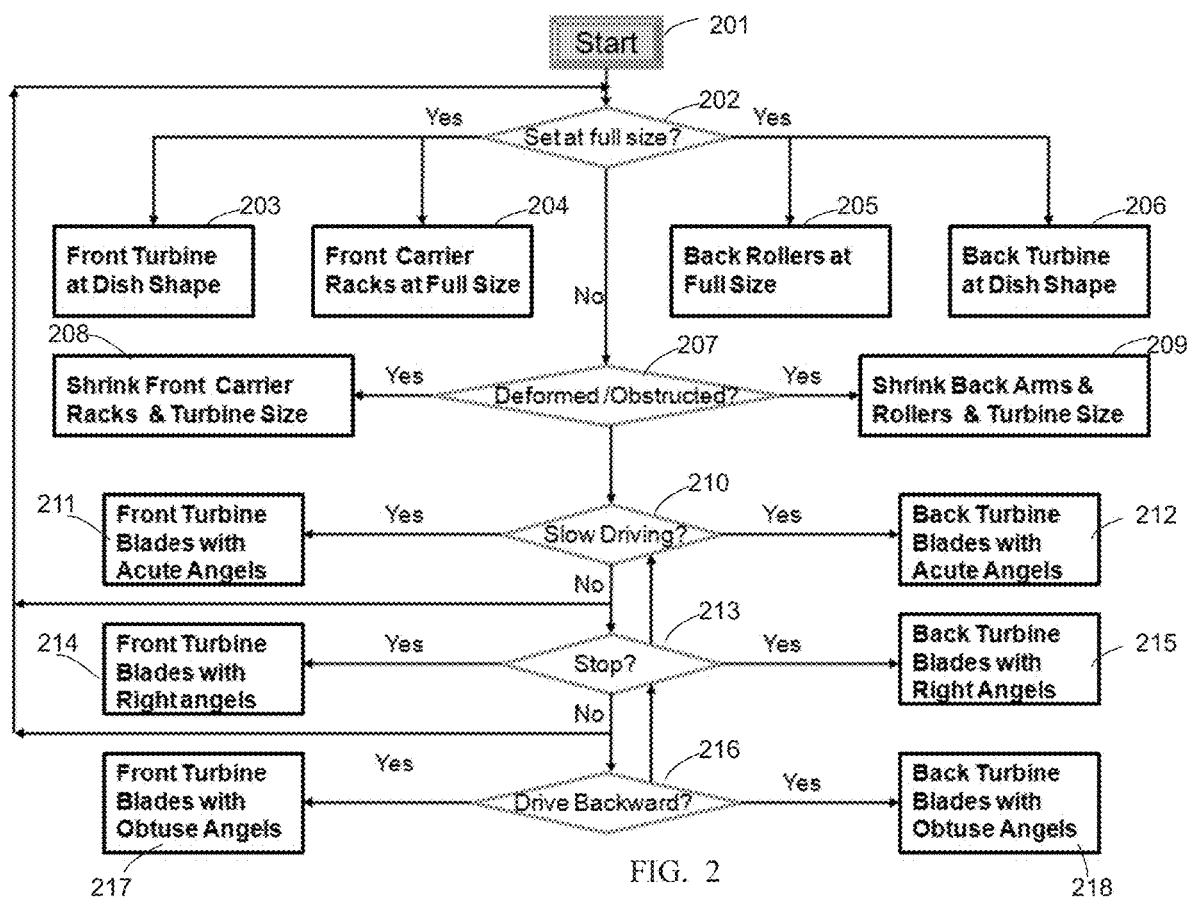
FIG. 2 illustrates a flow diagram of an embodiment of a method for the self-adaptive inline inspection vehicle with a finite set of control states.

FIG. 2 illustrates a flow diagram of an embodiment of a method for the self-adaptive inline inspection vehicle 102 with a finite set of control states. The initial state of the method is from the Start state 201. For the condition "Set at full size" 202, the system defines that every adjustable part of the self-adaptive inline inspection vehicle 102 is set at the full size state. For example, both front and back end of self-adaptive driving turbine wheels are at full size state and dish shape 203, 206; the front carrier racks with their rollers and device carts are at full size state 204; and the back rollers are at full size state 205. The full size states are further described with respect to FIG. 3A to FIG. 3D.

For "Deformed/Obstructed" condition 207, pipeline obstacles such as dented pipes or obstructions and deformations may prevent inline inspection tools from traversing the entire length of a pipeline. In this state, the front carrier racks with their rollers and device carts as well as turbine wheel are adjusted to a shrinking state 208, and the back rollers as well as turbine wheel also are adjusted to a shrinking state 209. The shrinking states are further described with respect to FIG. 4A to FIG. 4H. At "Deformed/Obstructed" condition 207, the "Slow Driving" condition 210 should also be considered.

For "Slow Driving" condition 210, the inline inspection vehicle 102 may be set at full size 202 or in a shrinking state, such as "Deformed/Obstructed" condition 207. The front driving turbine blades are adjusted at acute angle state 211, and the back driving turbine blades are also adjusted to an acute angle state 212. 'The "Slow Driving" condition 210 is further described with respect to FIG. 6A and FIG. 6B. At end of "Slow Driving" condition 210, the control states may either be changed back to "Set to full size" condition 202 or go to "Stop" condition 213.

For "Stop" condition 213, the front driving turbine blades are adjusted to a right angle state 214, and the back driving turbine blades are also adjusted to a right angle state 215. The "Stop" condition 213 is further described with respect to FIG. 7A to FIG. 7C. At end of the "Stop" condition 213, control states may be changed back to the "Slow Driving" condition 210, or back to the "Set to full size" condition 202 or go to the "Driving backward" condition 216.

At "Driving backward" condition 216, the front driving turbine blades are adjusted to an obtuse angle state 217, and the back driving turbine blades are also adjusted to an obtuse angle state 218. The "Driving backward" condition 216 is further described with respect to FIG. 8A and FIG. 8B. At the end of the "Driving backward" condition 216, control states must be changed back to "Stop" condition 213.

Figure 3A:
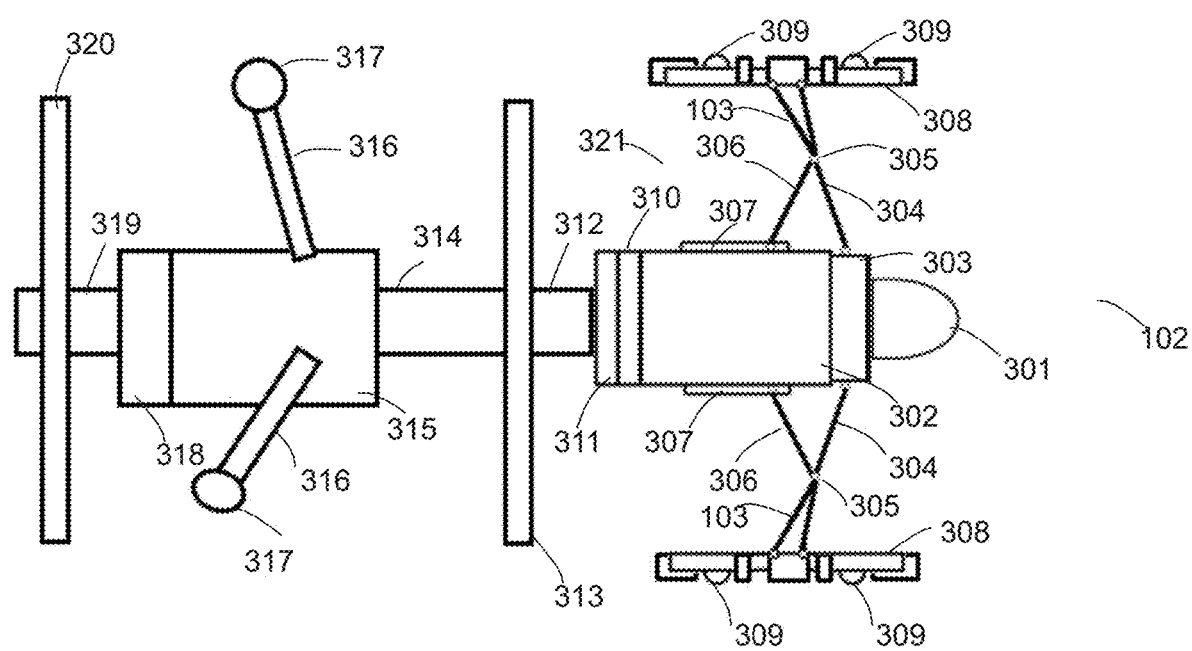
FIG. 3A illustrates a schematic block diagram of an embodiment of the inline inspection vehicle with self-adaptive system structure at full size state in detail.

FIG. 3A illustrates a schematic block diagram of an embodiment of the inline inspection vehicle 102 with self-adaptive system structure at full size state in detail. The inline inspection vehicle 102 can be launched from stations, such as compressor stations or gate stations in gas pipelines, or pump stations in crude oil pipelines, and travel through the pipeline 101 to be received at any other station downstream. The inline inspection vehicle 102 includes a head 301 that may be configured as an inspection device container to carry advanced sensors or a digital radiographic camera, or guided wave ultrasonic testing (GWUT) device.

The front body 321 of the inline inspection vehicle 102 has a base part 302 and a movable part 303. The base part 302 and movable part 303 include a pair of outer-inner cylinders that are coupled such that the movable part 303 is configured to move with respect to the base part 302. For example, the movable part 303 is controlled by actuator 310 to move forward and outward longitudinally from the base part 302 to elongate a length of the front body 321 of the inline inspection vehicle 102. The movable part 303 is further controlled by the actuator 310 to move backward and inward longitudinally into the base part 302 to shorten a length of the front body 321 of the inline inspection vehicle 102.

The actuator 310 may control the movable part 303 to move forward or backward longitudinally with respect to the front base part 302 to adjust a size and position of the carrier racks 103. The carrier rack 103 is basically composed by main struts 304 and auxiliary struts 306; the top of auxiliary strut 306 is jointly connected to the middle of main strut 304 with a bearing 305, the bottom of auxiliary strut 306 is a roller which is held by a guided slide rail track 307. The bottom of main strut 304 is hinged to the movable part 303 with a bearing. The upper part of main strut 304 is like a fork to support the inspection device cart 308, both also connect each other with a bearing. The positioning roller(s) 309 mounted on the device cart 308 play(s) an important role in guiding the inspection vehicle's movement smoothly by interacting with the pipe's inner wall.

The movement of the movable part 303 thus adjusts the state of the carrier racks 103. For the condition "Set at full size" 202 in FIG. 2, the actuator 310 controls the movable part 303 to move backward and inward longitudinally into the base part 302 to shorten the length of the front body 321 of the inline inspection vehicle 102. In this position, the main 304 and auxiliary struts 306 of the carrier racks 103 are in closer proximity extending the length of the carrier racks 103 such that the carrier racks are in an extended or full size state. For a "Deformed/Obstructed" condition 207, the actuator 310 controls the movable part 303 to move forward and outward longitudinally from the base part 302 to elongate the length of the front body 321 of the inline inspection vehicle 102. The roller on the bottom of auxiliary strut 306 slides in the guided slide rail track 307 in an opposing direction from the movable part 303. This movement of the auxiliary strut 306 extends the distance between the main strut 304 and the auxiliary strut 306 to shorten the front carrier racks 103 to a shrinking state 208.

Thus, when the carrier rack 103 is in a radially contracted state, the inner cylinder of the movable part 303 is extended relative to the outer cylinder of the base part 302, and when the carrier rack 103 is in a radially extended state, the inner cylinder of the movable part 303 is retracted relative to the outer cylinder of the base part 302. Though two carrier racks 103 are shown in this embodiment, less or more carrier racks 103 may be implemented on the inline inspection vehicle 102.

An actuator 311 controls a front adjustable turbine wheel 313 through the steering axis 312. The steering axis 312 is coupled to the front base part or body 321 and the front turbine wheel 313, and the actuator 311 controls a speed of the front turbine wheel 313. Similarly, actuator 318 controls a back adjustable turbine wheel 320 through the steering axis 319. The steering axis 319 is coupled to the back base part or body 315 and the back turbine wheel 320, and the actuator 318 controls a speed of the back turbine wheel 320.

Both front body 321 and back body 315 are connected with a universal joint 314 working like a hip wrist to be suitable for different shapes of pipelines. The universal joint 314 allows the front body 321 to rotate with respect to the back body 315 such that the front body 321 may be at an angle with respect to the back body 315.

The back positioning rollers 317 with supporting arms (struts) 316 are also adjustable as with the front carrier racks 103 and rollers 309. The back-positioning rollers 317 with supporting struts 316 are connected via a hinge or other pivoting means to the back body 315. A spring or other tensioning device exerts a force to hold the supporting struts 316 relatively perpendicular to the back body 315. When the pipeline wall interacts with or exerts pressure on the back-positioning rollers 317 greater than the tension force of the tensioning device, the supporting struts 316 rotate towards the back body 315. The supporting structs 316 and back positioning rollers 317 assist in positioning and guiding the inline inspection vehicle 102 centrally within the pipeline 101. In addition, the actuator 318 may also control the supporting struts 316 to fold into the back body 315 or extend outward from the back body 315.

This embodiment is an example and other components may be implemented in addition to or alternatively to those described. For example, though only two supporting structs 316 and back positioning rollers 317 are illustrated, additional supporting structs 316 and back positioning rollers 317 may be implemented. Similarly, additional inspection device carts 308 or carrier racks 103 may be implemented or additional inspection device cart 308 and carrier rack 103 in reversed configuration may be implemented as described in FIG. 4A.

Figure 3B:
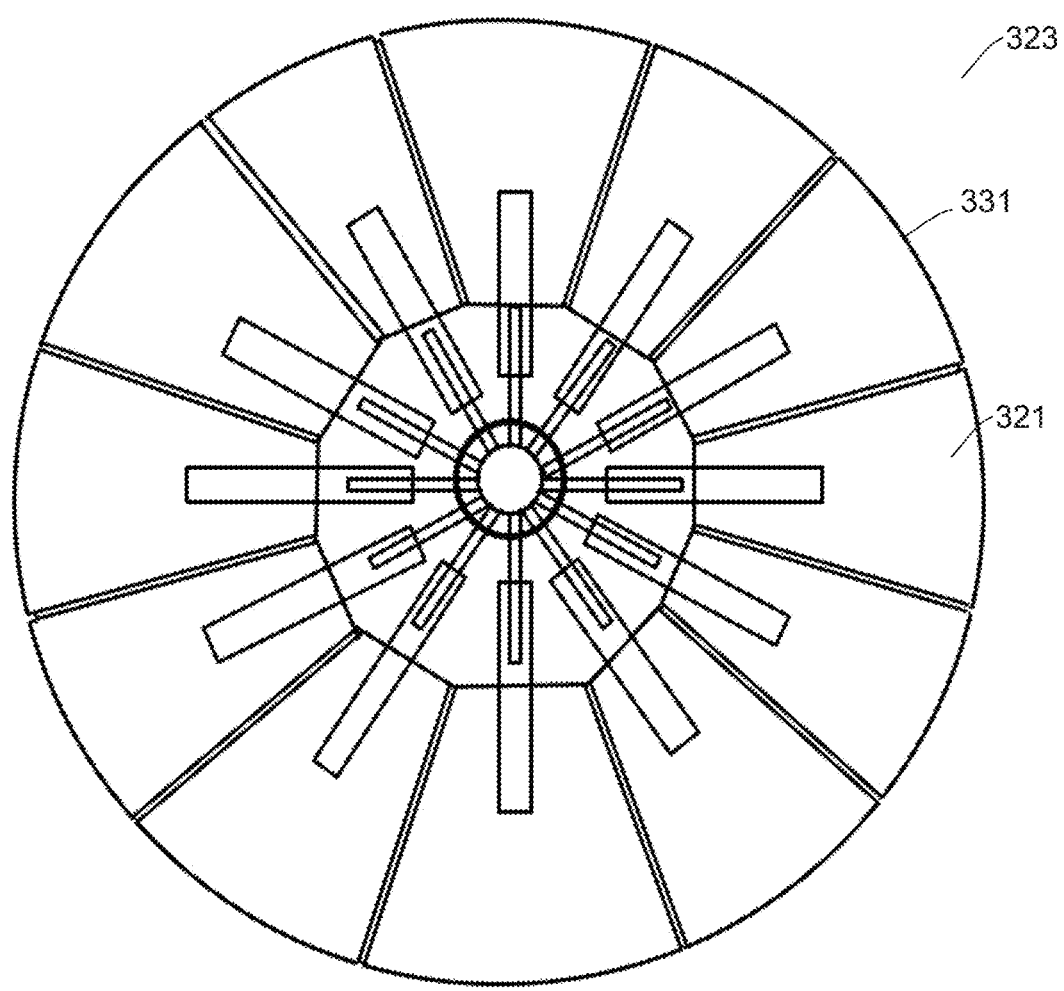
FIG. 3B illustrates an example embodiment of an adjustable turbine wheel at a full size state with a dish shape.

FIG. 3B illustrates an example embodiment of an adjustable turbine wheel 323 at a full size state with a dish shape 331. The adjustable turbine wheel 323 may be implemented as the front adjustable turbine wheel 313 and/or the back adjustable turbine wheel 320. The adjustable turbine wheel 323 includes a plurality of wheel blades 321.

Figure 3C:
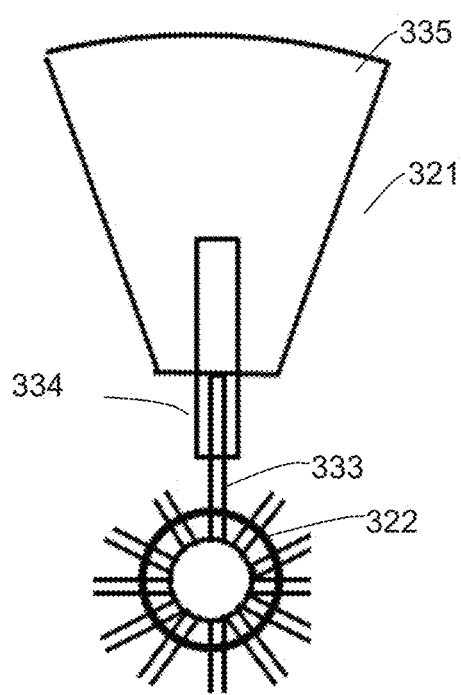
FIG. 3C and FIG. 3D illustrate an example embodiment of one of the plurality of wheel blades in a full size state.
Figure 3D:
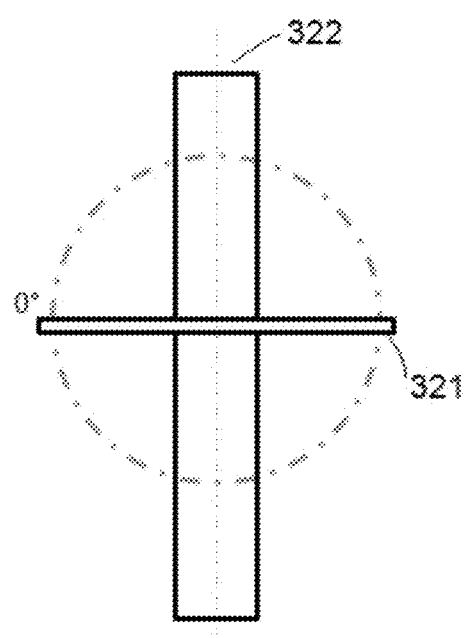

FIG. 3C and FIG. 3D illustrate an example embodiment of one of the plurality of wheel blades 321 in a full size state. The wheel blade 321 includes three parts: a vane 335, middle part 334, and supporting strut 333. The relative positions of those parts may be adjusted, and the size of the turbine wheel 323 is correspondingly changed. If the central line of an axis 322 of the adjustable turbine wheel 323 in FIGS. 3C and 3D is considered as ordinate, then each wheel blade 321 coincides with abscissa—at 0°. The vane 335, middle part 334, and supporting strut 333 may move relative to one another to increase and decrease the circumference of the adjustable turbine wheel 323.

Figure 4A:
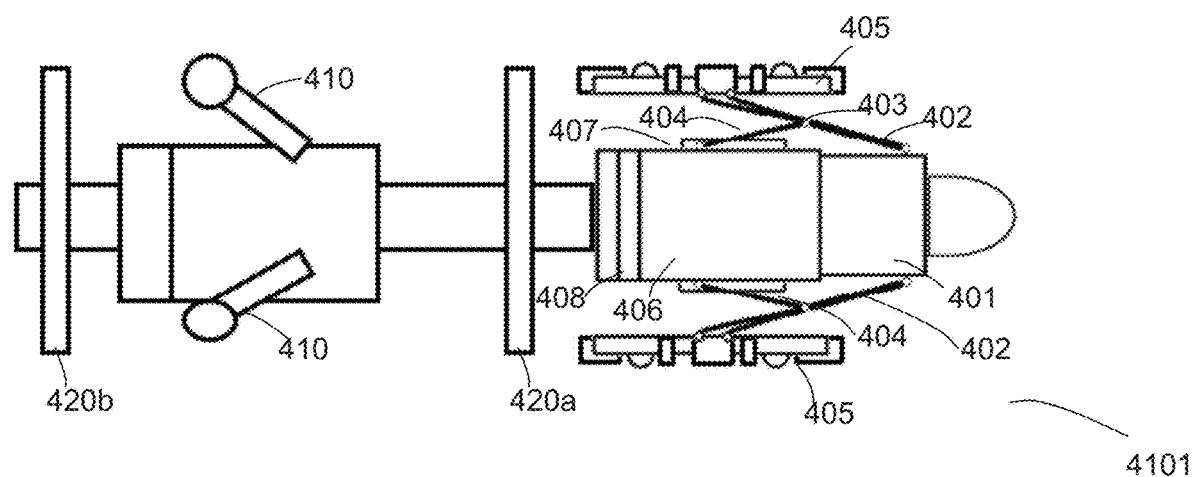
FIG. 4A illustrates a schematic block diagram of an embodiment of a first carrier rack configuration with a backward setting.
Figure 4B:
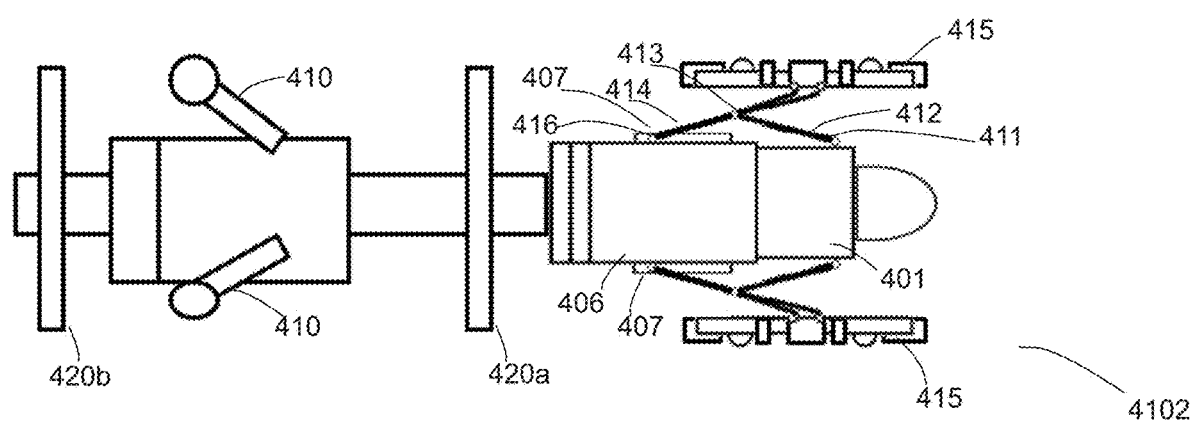
FIG. 4B illustrates a schematic block diagram of an embodiment of a second carrier rack configuration with a forward setting.

FIGS. 4A and 4B illustrate example embodiments of the inline inspection vehicle 101 with self-adaptive system structure at a shrinking state. FIG. 4A illustrates a first carrier rack configuration with a backward setting 4101, and FIG. 4B illustrates a second carrier rack configuration with a forward setting 4102. For both side views 4101 on FIG. 4A and 4102 on FIG. 4B, the front adjustable turbine wheel 420a and the back adjustable turbine wheel 420b are at shrinking states, and the back position rollers 410 are also at shrinking states.

In the side view on FIG. 4A of the inline inspection vehicle, the actuator 408 pushes the movable part 401 to slide forward, and main strut 402 is attached to and follows the movable part 401 forward, then transfers movement, through joint bearing 403 to auxiliary strut 404. The bottom roller of auxiliary strut 404 moves backward along the track 407, so that the carrier rack keeps shrinking with the four-bar mechanism, and the inspection device cart 405 also follows the carrier rack's shrinking in the backward direction. When the carrier rack is in the radially contracted state, the bottom roller of the auxiliary strut 404 is moved to a back position along the guiding track on the outer cylinder. When the carrier rack is in the radially extended state, the bottom roller of the auxiliary strut 404 is moved to the front position along the guiding track on the outer cylinder.

The side view 4102 on FIG. 4B of the inline inspection vehicle shows the reverse configuration setting for the carrier racks at a shrinking state. The bottom of auxiliary strut 412 is hinged to the movable part 401 with a bearing 411, and the bottom roller 416 of main strut 414 moves backward along the track 407. When the movable part 401 is pushed to slide forward, the auxiliary strut 412 follows the movable part 401 forward, then transfers movements through joint bearing 413 to main strut 414. Then the carrier rack and the inspection device cart 415 also keeps shrinking with the four-bar mechanism in a reverse direction comparing the previous side view 4101 to forward. When the carrier rack is in the radially contracted state, the bottom roller 416 of main strut 414 is moved to a back position along the guiding track on the outer cylinder. When the carrier rack is in the radially extended state, the bottom roller 416 of main strut 414 is moved to the front position along the guiding track on the outer cylinder.

In an embodiment, the plurality of carrier racks connected to the vehicle body and extending radially outward from the vehicle body are circularly and evenly arranged around the vehicle body. In an embodiment, two neighbored carrier racks are in reverse configurations: one in a forward configuration of FIG. 4A and the neighboring carrier rack in a reverse configuration of FIG. 4B. The combination of two reversed configurations could make the inspection device carts 415 move in different directions and positions longitudinally. Thereafter, it avoids the inspection device carts' squeezing and colliding with the decrease of the inspection device cart's radius during the process of converting to the shrinking states.

Figure 4C:
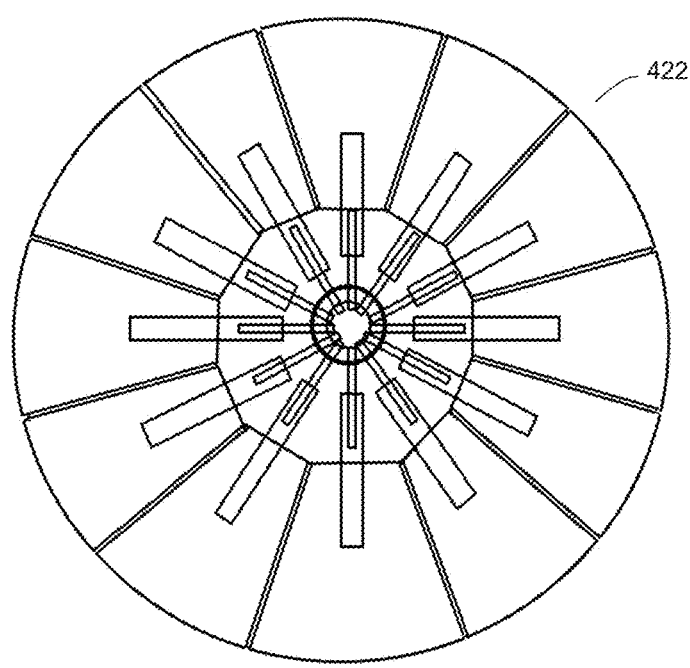
FIG. 4C illustrates a schematic block diagram of an embodiment of a turbine wheel in a full size state.
Figure 4D:
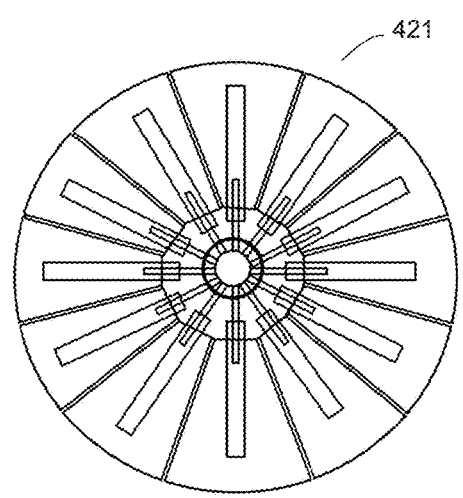
In FIG. 4D illustrates a schematic block diagram of an embodiment of a turbine wheel in a smaller state.
Figure 4E:
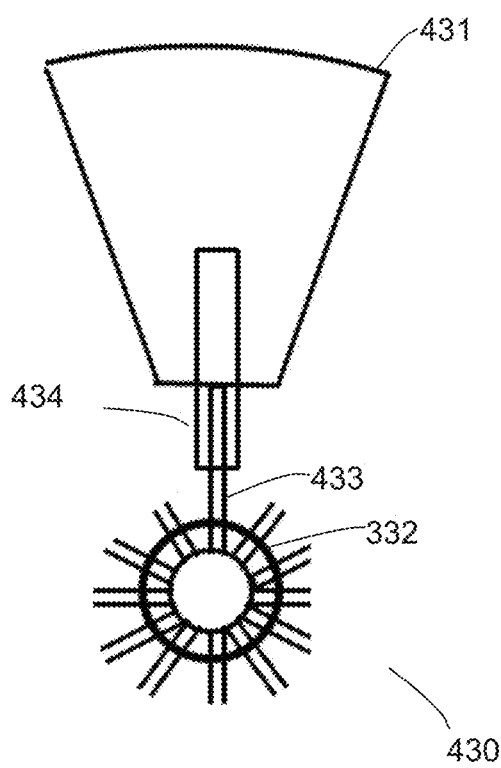
FIG. 4E-4H illustrates a schematic block diagram of an embodiment of a turbine wheel in a full size state and a smaller state.
Figure 4F:
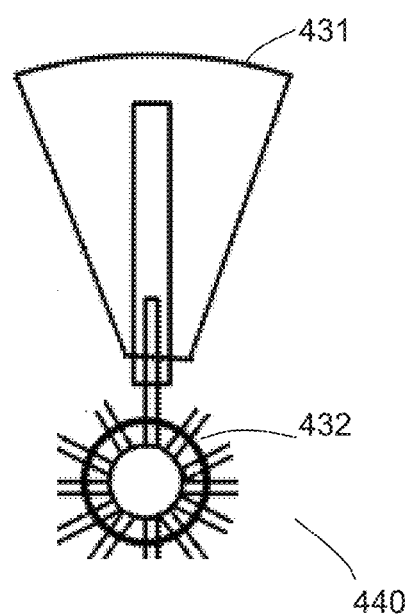

FIGS. 4C and 4D illustrate an example embodiment of the self-adaptive driving turbine wheel 420. In FIG. 4C, the driving turbine wheel 420 is in a full size state 422. In FIG. 4D, the driving turbine wheel 420 is in a smaller state 421.

Figure 4G:
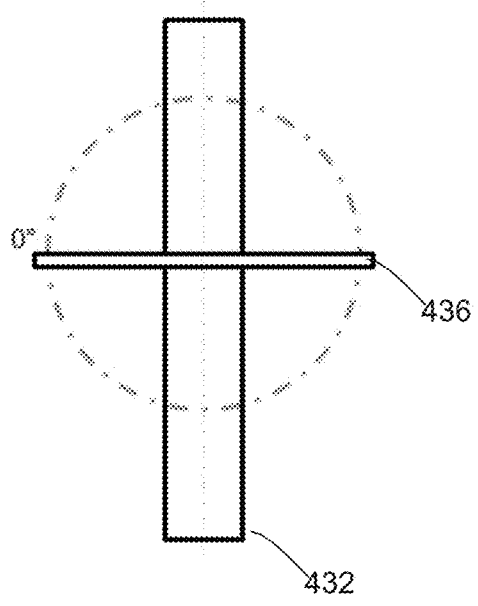
Figure 4H:
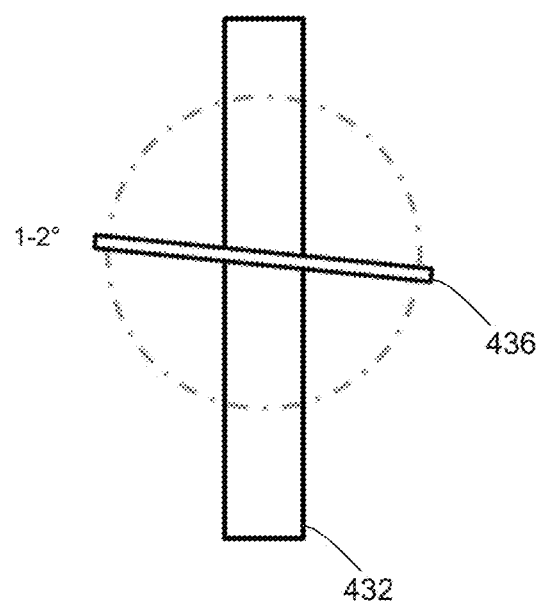

FIG. 4E through 4H illustrate an example embodiment of the driving turbine wheel 420 in the full size state 422 and the smaller state 421. Similar to FIG. 3B, FIGS. 4C, 4E, and 4G show the driving turbine wheel 420 at full size state 422 with a dish shape. In FIG. 4G, each wheel blade 436 is perpendicular to wheel axis 432, coincides with abscissa—at 0°. The wheel blade 436 is in the initial state 430 in FIG. 4E, and it changes to the shrinking state 440 as shown on FIG. 4F. The three parts of each wheel blade 436: a vane 431, middle part 434, and supporting strut 433 and their relative positions are adjusted for shrinking. As shown in FIG. 4G and FIG. 4H, the wheel blade 436 is inclined clockwise about 1°-2° to abscissa, and not perpendicular to wheel axis 432 anymore. It still keeps the driving turbine wheel 420 at a dish shape, but the wheel vanes 431 could be overlapped by slightly tilting.

Thus, when the front turbine wheel 420a or the back turbine wheel 420b is in a radially contracted state, each of the plurality of wheel blades 436 is configured to incline clockwise approximately 1°-2° to abscissa, and the vane 431 and middle part 434 are configured to contract inward radially. When the front turbine wheel 420a or the back turbine wheel 420b is in a radially extended state, each of the plurality of blades 436 is configured to extend outward with its vane 431 and middle part 433 extended outward radially.

The relative contraction or extension of the three parts of the wheel blade 436 can be achieved through different mechanisms. One of the alternatives is the central tie rod and spring: the tie rod pulls the wheel blade 436 and the spring to contract at the same time; when the tie rod is relaxed, the spring pushes the wheel blade 436 to expand.

Figure 5A:
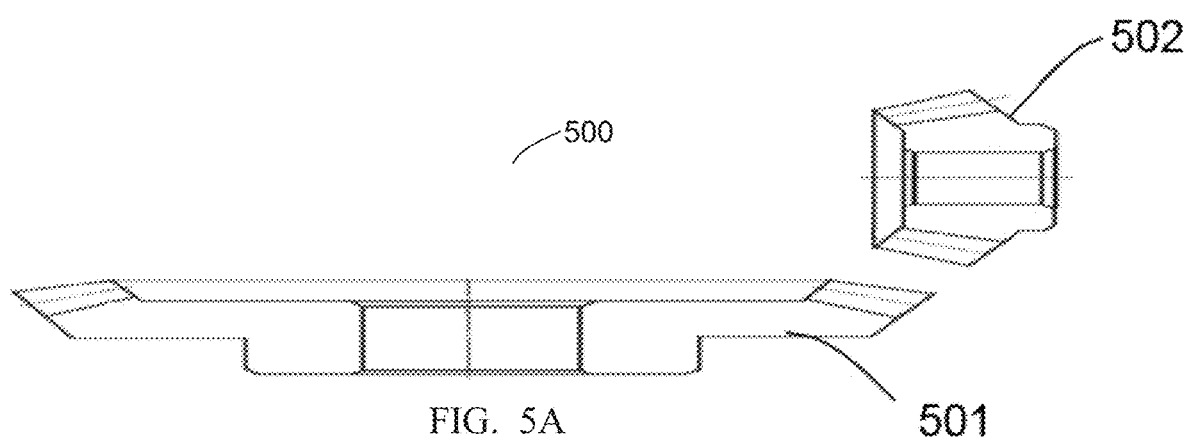
FIG. 5A and FIG. 5B illustrate a schematic block diagram of an embodiment of an example embodiment of a gear clutch.
Figure 5B:
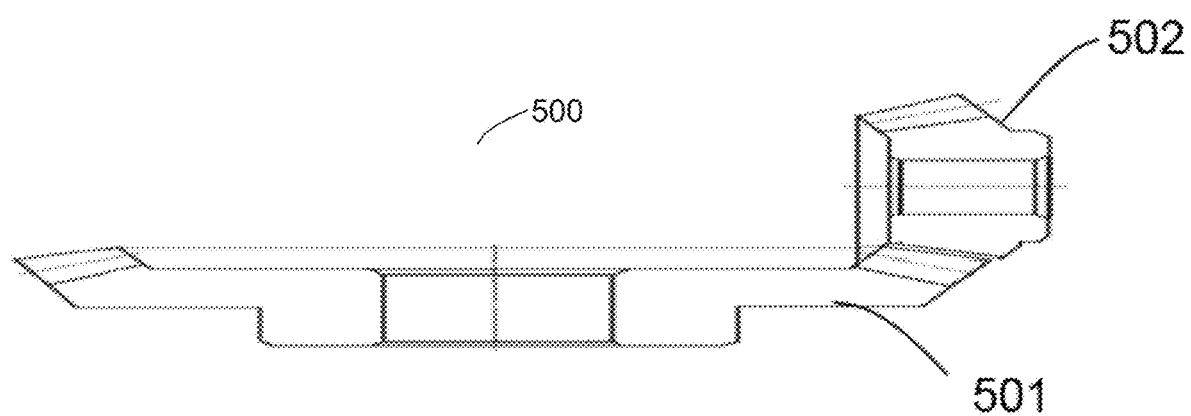

FIG. 5A and FIG. 5B illustrate a schematic block diagram of an example embodiment of a gear clutch 500. Inside the wheel axis 432, there is a gear control system including a one-to-many right-angle bevel gear clutch 500. The gear clutch 500 is illustrated in FIGS. 5A and 5B, and it controls the rotation of the wheel blade 536 shown in FIG. 5C. The gear clutch 500 controls a rotation with certain degrees with one driving gear 501 and multiple driven gear 502.

Figure 5C:
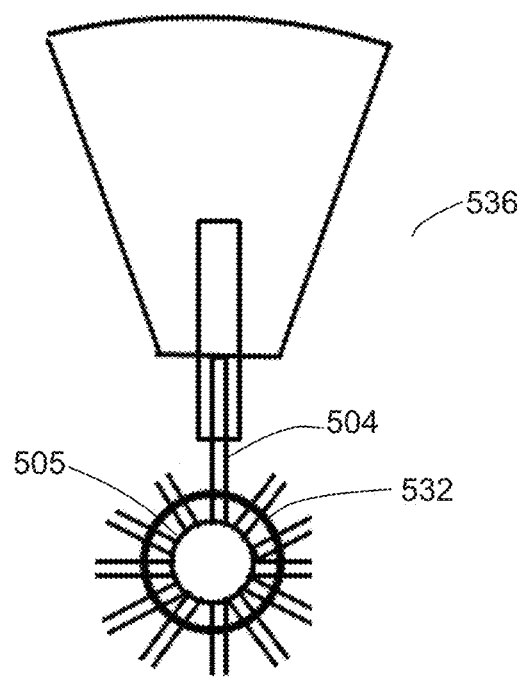
FIG. 5C illustrates a schematic block diagram of an example embodiment of a turbine wheel blade with a gear clutch.

FIG. 5C illustrates a schematic block diagram of an example embodiment of a turbine wheel blade with a gear clutch 500. In FIG. 5C, the turbine wheel's axis 532 is the same axis 432 in FIG. 4E to 4H. It is like a pipe or out layer of the turbine wheel's axis 532 for positioning each wheel blade strut 504. At the bottom of each wheel blade strut 504, a driven gear 502 is mounted. The inner axis 505 of the turbine wheel 420 is installed with a driving gear 501.

Normally, each driven gear 502 keeps a distance with driving gear 501 and the pair do not couple with each other. When the wheel blades 536 need to rotate with certain degrees, the driving gear 501 couples with the driven gear 502 and drives the rotation of the wheel blades 536. The driving gear 501 and the driven gear 502 have a meshing position, in which the rotation of the driving gear 501 drives the driven gear 502 to rotate, such that each of the plurality of wheel blades 536 rotate about its respective longitudinal axis.

Figure 6A:
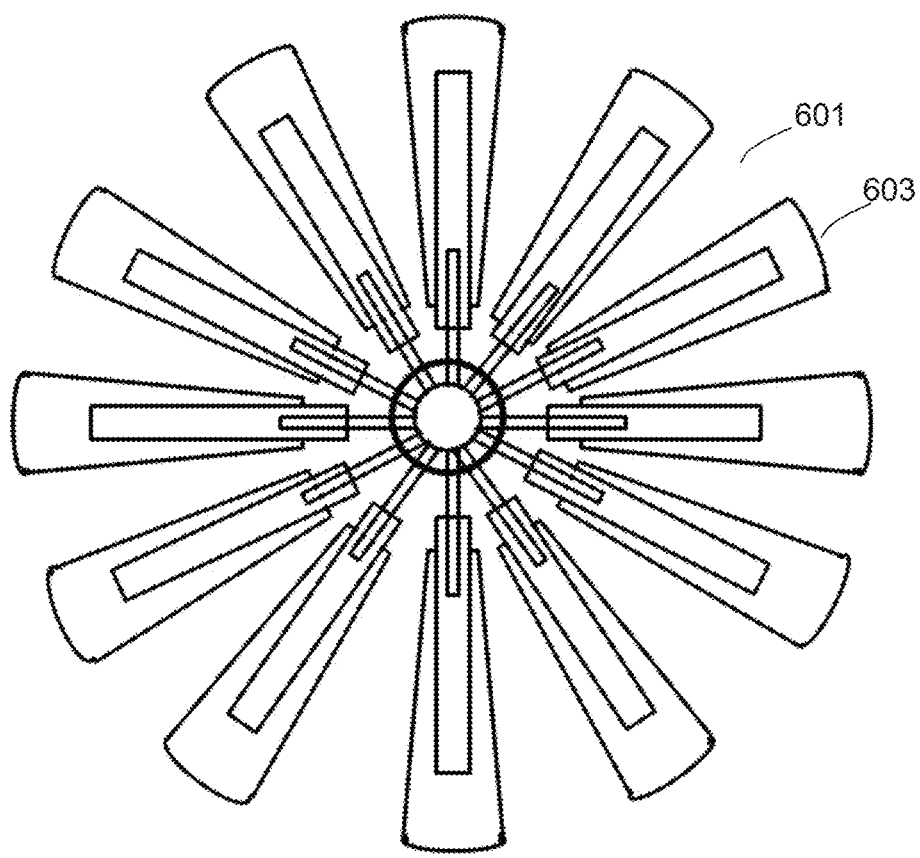
FIG. 6A and FIG. 6B illustrate a schematic block diagram of an example embodiment of self-adaptive driving turbine wheel blades in a slow driving state.
Figure 6B:
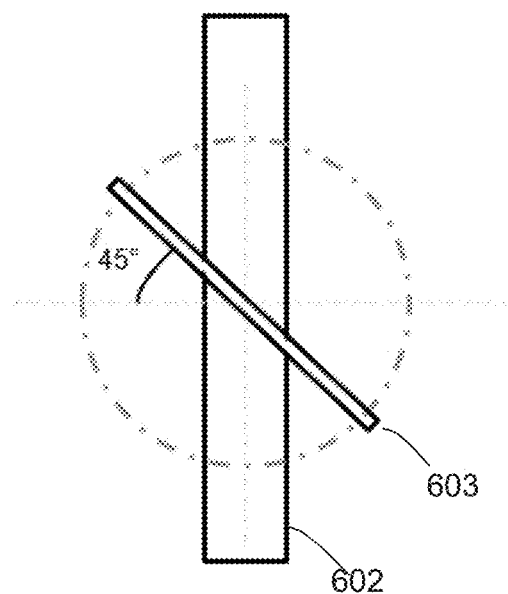

FIGS. 6A and 6B illustrates a schematic block diagram of an example embodiment of the self-adaptive driving turbine wheel blades 603 turned to a slow driving state 601. The wheel blade 603 is rotated clockwise approximately to 45° or another acute angle to abscissa and inclined from the initial position which is perpendicular to the turbine wheel axis 602.

Figure 7A:
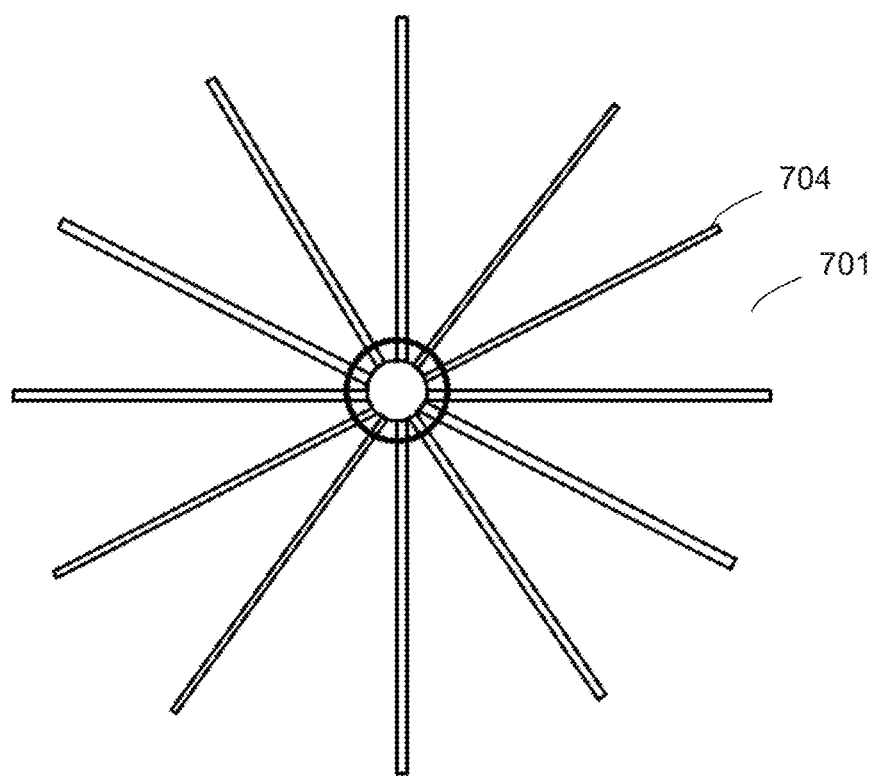
FIGS. 7A, 7B and 7C illustrate a schematic block diagram of an example embodiment of self-adaptive driving turbine blades in a stop state.
Figure 7B:
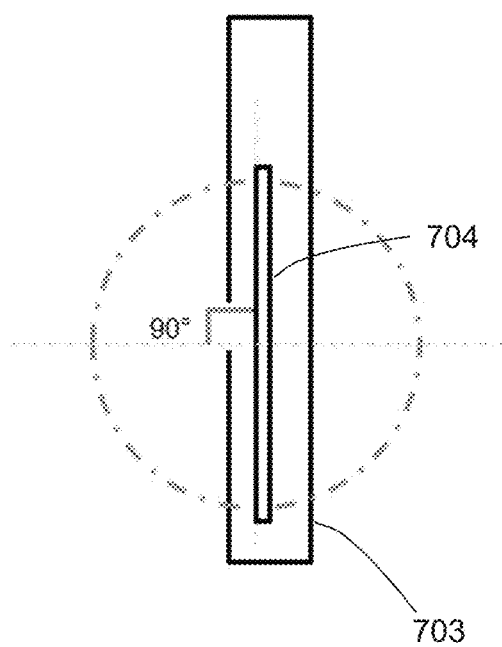
Figure 7C:
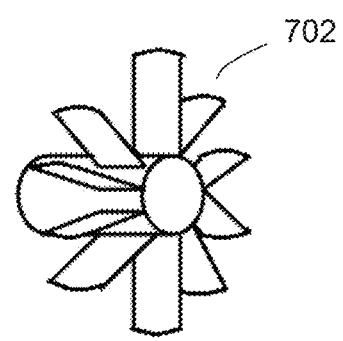

FIG. 7A-7C illustrate a schematic block diagram of an example embodiment of self-adaptive driving turbine blades 704 in a stop state 701. FIG. 7A illustrates a side view of the turbine wheel 701 which is visualized in a 3-dimensional format 702 in FIG. 7C. In FIG. 7B, the wheel blade 704 rotates clockwise to approximately 90° (or within 5 degrees thereof) to become approximately perpendicular to abscissa, and it turns to coincide with the turbine wheel axis 703.

FIG. 8A and FIG. 8B illustrate a schematic block diagram of an example embodiment of the self-adaptive driving turbine wheel blades 803 in a backward state 801. In FIG. 8B, the wheel blade 803 is rotated clockwise 135° or to another obtuse angle to abscissa and is turned away from the turbine wheel axis 802. Based on estimation, the most efficient position for driving turbine wheel's backward movement should be an obtuse angle greater than 150°.

The product in the pipeline, such as natural gas, is transported by the pressure, and the pressure pushes the wheel blades 803 in the obtuse state to reverse, so that the inspection vehicle 102 may move backward in the pipeline 101. When the backward force formed by the driving turbine wheel blades 803 is not sufficient to overcome the forward thrust relative to the product flow, such as natural gas, an optional solution is to configure a power motor for the shaft. The power motor may accelerate the rotation of the driving turbine wheel to generate a larger backward force, and then the inspection vehicle 102 may be reversed.

The inline inspection device is thus configured that when in a fast speed state, the front turbine wheel and the back turbine wheel are configured in a dish shape. When in a slow speed state, each of the plurality of wheel blades are configured to rotate clockwise to an acute degree to abscissa. When in a stop speed state, each of the plurality of blades are configured to rotate clockwise approximately 90° to approximately perpendicular to abscissa. When in a backward state, each of the plurality of blades are configured to rotate clockwise to an obtuse degree to abscissa.

Figure 9A:
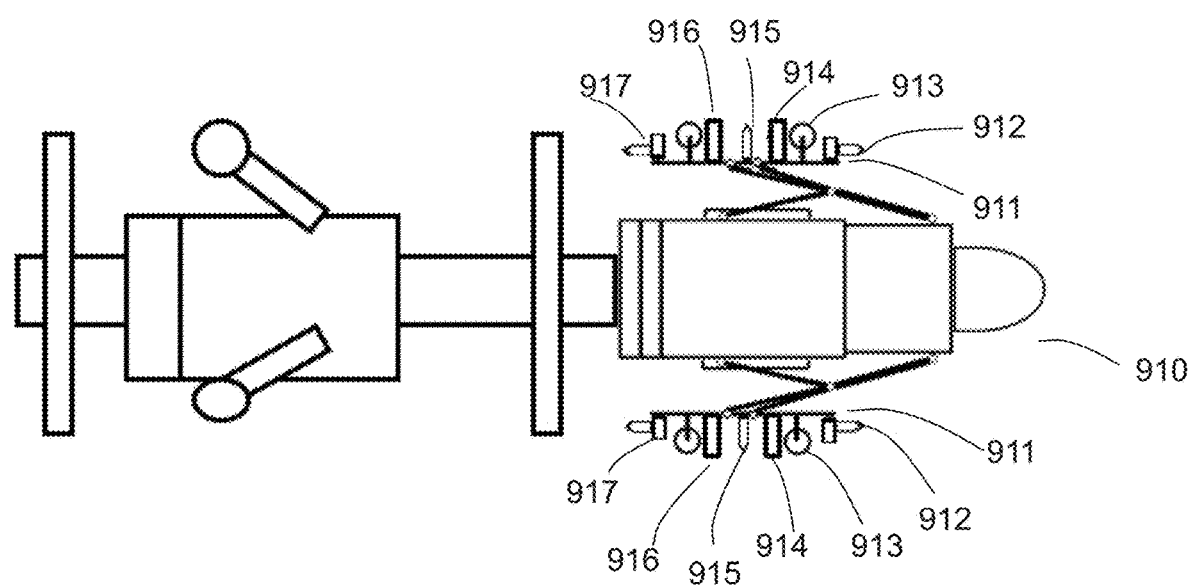
FIG. 9A illustrates a schematic block diagram of an embodiment of the inspection vehicle in a reduced size state.

FIG. 9A illustrates a schematic block diagram of an embodiment of the inspection vehicle 910 in a reduced size state. In FIG. 9A, the inspection vehicle 910 is a real example demonstrating how the adjustable carrier racks to carry the large-size cart 911 with two rollers 913 structure which combine an assembly of probes using multiple sensors/transducers. The front sensor 912 may include a deformation probing sensor. The coupling magnets 914, 916 and sensor 915 may implement a Magnetic flux leakage (MFL) testing. The sensor 917 may include a pressure testing or another probing sensor. In other examples, the inline inspection vehicle 910 may include one or more of devices for ultrasound testing tools, electromagnetic acoustic transducer (EMAT) testing, guided wave ultrasonic testing (GWUT) tools, and caliper in line tools, as well as Intelligent In line Data Acquisition Devices. One or more sensors may be configured to detect one or more of: radial displacement, pressure, temperature, flows, and acoustics in the pipeline. Furthermore, it may conduct virtual pressure tests by carrying intelligent inline data acquisition devices to converge the Pipeline Integrity Management with SCADA monitoring system.

Figure 9B:
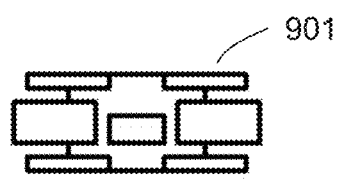
FIG. 9B-9D illustrate a schematic block diagram of an embodiment of a roller cart with a single positioning roller structure.
Figure 9E:
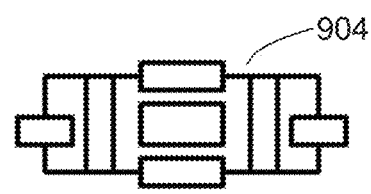
FIG. 9E-9G illustrate a schematic block diagram of an embodiment of a small roller cart with a two positioning roller structure.
Figure 9C:
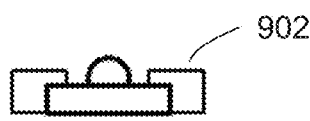
Figure 9F:
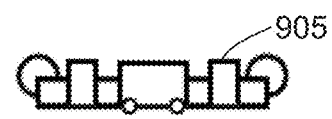
Figure 9D:
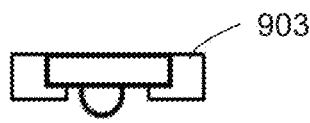
Figure 9G:
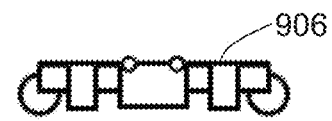
Figure 9H:
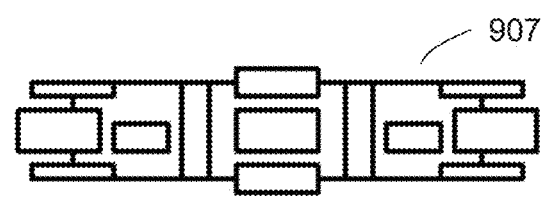
FIG. 9H-9J illustrate a schematic block diagram of an embodiment of a big roller cart with a two positioning roller structure.
Figure 9I:
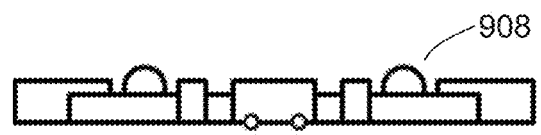
Figure 9J:
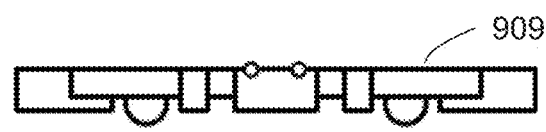

FIG. 9B to 9J illustrate a schematic block diagram of three types of example embodiments for the inspection device carts 911 on the inline inspection vehicle 910. FIG. 9B-9D illustrate a schematic block diagram of an embodiment of a roller cart with a single positioning roller structure 901. FIG. 9E-9G illustrate a schematic block diagram of an embodiment of a small roller cart 904 with a two positioning roller structure. FIG. 9H-9J illustrate a schematic block diagram of an embodiment of a big roller cart 907 with two positioning roller structure. The FIGS. 9B-9J illustrate the top view and layout for each type of cart 911. FIG. 9B illustrates a top view of the first roller cart 901 while a first side view 902 is illustrated in FIG. 9C and a second side view 903 is illustrated in FIG. 9D. FIG. 9E illustrates a top view of the small-size two roller cart 904 while a first side view 905 is illustrated in FIG. 9F and a second side view 906 is illustrated in FIG. 9G. FIG. 9H illustrates a top view of the big two roller cart 907 while a first side view 908 is illustrated in FIG. 9I and a second side view is illustrated in FIG. 9J.

Figure 10:
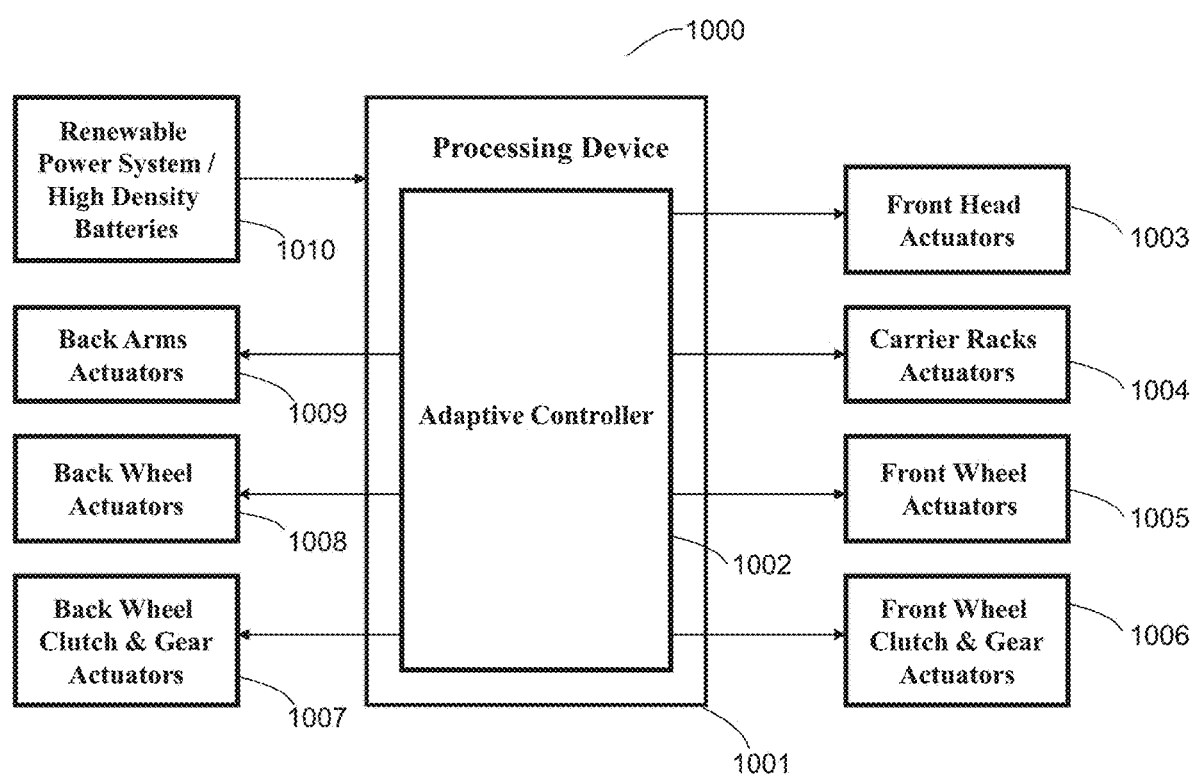
FIG. 10 illustrates a schematic block diagram of an example embodiment of an intelligent adaptive control system of the inline inspection vehicle with self-adaptive system structure.

FIG. 10 illustrates a schematic block diagram of an example embodiment of an intelligent adaptive control system 1000 of the inline inspection vehicle 102 with self-adaptive system structure. A Processing Device 1001 including an operating system supports the adaptive controller 1002. The adaptive controller 1002 may include a self-adaptive schema with a finite set of control states as described with respect to FIG. 2. The adaptive controller 1002 may be implemented with sophisticated algorithms for a self-tuning control mechanism under an uncertain working environment.

According to the methods of Markov decision-making process and dynamic programming theory, the reinforcement learning method is introduced. By using online planning, hierarchical planning, Monte Carlo simulation, etc., accurate adaptive algorithms can be obtained to determine the state and location parameters.

The processing device 1001 may be powered with the reliable high density batteries, which is part of the renewable power system 1010, described in U.S. patent application Ser. No. 16/739,459 filed on Jan. 10, 2020 and incorporated by reference herein.

The intelligent control loop is based on the feedbacks from the sensors on the board to determine the precisely adaptive states for different parts. Then control commands and instructions are computed and sent in coordination to actuators: Front Head Actuator 1003, Carrier Racks Actuator 1004, Front Wheel Actuators 1005, and Front Wheel Clutch & Gear Actuators 1006; Back Wheel Clutch & Gear Actuators 1007, Back Wheel Actuators 1008, and Back Arms Actuators 1009.

The adaptive controller 1002 controls the plurality of actuators in response to an input of one or more sensors and configures the inline inspection vehicle 102 to one of: the full size state or the reduced size state, and one of: the fast speed state, the slow speed state, the stop speed state, or the backward state.

In use, with a specialized inspection tool built on the top of this inline inspection vehicle with self-adaptive system structure, there may be many more sub-states with different parameter configurations derived from the finite set of control states than described with respect to FIG. 2. So, the feedback loops and intelligent control loop can organically work together to realize the mechanism of precisely guiding navigation and self-tuning control.

In example embodiments, the inline inspection vehicle 102 has the full size state and the shrinking state, the fast speed state, the slow speed state, the stop state, and the backward state. In the full size state, the carrier racks and the wheel blades of the front driving turbine wheel and the back driving turbine wheel are all in a radial extension state. In the shrinking state, the carrier racks and the wheel blades of the front driving turbine wheel and the back driving turbine wheel are in a radial contraction state.

In the fast speed state, the wheel blades of the front driving turbine wheel and the back driving turbine wheel are in an initial angular position substantially perpendicular to the machine shaft; in the slow speed state, the wheel blades of the front driving turbine wheel and the back driving turbine wheel are at acute angular position with respect to the initial position. In the stop state, the wheel blades of the front driving turbine wheel and the back driving turbine wheel are at a right angle with respect to the initial position; in the back state, the wheel blades of the front driving turbine wheel and the back driving turbine wheel are made at an obtuse angle with respect to the initial position.

In example embodiments, the inline inspection vehicle 102 includes an adaptive controller system and an actuation system 1000, wherein the control system controls the actuation system according to the input of the sensors. For example, the control system determines whether the pipe wall is deformed, or whether there are obstacles or abnormal conditions found in the pipe. When the control system determines that there is no deformation or obstacle in the pipeline according to the input of the sensor, the inspection vehicle 102 is set to the full size state. And conversely, when the control system determines that there is a deformation or obstacle in the pipeline according to the input of the sensor, the inspection vehicle 102 is set to the shrinking state. When the control system determines that the pipeline is normal, the inspection vehicle 102 is set to the fast speed state; when the control system determines that there is a deformation or an obstacle in the pipeline, or when there is an abnormal situation in the pipeline that needs to be inspected, the inspection vehicle is set to slow speed state.

When the control system determines that there is an abnormal situation in the pipeline that requires focused inspection, the inspection vehicle 102 can be set to a stop state. When the control system determines that the inspection vehicle 102 needs to be reversed for inspection, the inspection vehicle 102 can be set to the backward state.

The renewable power system 1010 may also supply power to all operations of this inline inspection vehicle 102 with self-adaptive system structure, and all probing and testing applications implemented with the inline inspection vehicle 102. The thermoelectric generators integrated with this renewable power system 1010 may meet all power requirements of the inline inspection vehicle 102 and help to improve the reliability and adaptability of the inline inspection vehicle 102.

In one or more aspects herein, a processing device includes at least one processing circuit, such as a microprocessor, micro-controller, digital signal processor, microcomputer, neural network, AI processor, Quantum processor, field programmable gate array, programmable logic device, state machine, logic circuitry, analog circuitry, digital circuitry, and/or any device that manipulates signals (analog and/or digital) based on hard coding of the circuitry and/or operational instructions. A memory device as used herein is a non-transitory memory and may be an internal memory or an external memory, and the memory may be a single memory device or a plurality of memory devices. The memory may be a read-only memory, random access memory, and/or any non-transitory memory device that stores information. In general, a processing circuit, unit or device is configured to perform one or more of the functions described herein in response to instructions stored in a memory device.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, frequencies, wavelengths, component values, integrated circuit process variations, temperature variations, rise and fall times, and/or thermal noise. Such relativity between items ranges from a difference of a few percent to magnitude differences.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the claims. The specification and figures are illustrative, rather than restrictive, and modifications are intended to be included within the scope of the claims. Accordingly, the scope of the claims should be determined by the claims themselves and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

In the foregoing specification, certain representative aspects have been described with reference to specific examples. Various modifications and changes may be made, however, without departing from the scope of the claims. The specification and figures are illustrative, rather than restrictive, and modifications are intended to be included within the scope of the claims. Accordingly, the scope of the claims should be determined by the claims themselves and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

The invention claimed is:

1. An inline inspection vehicle configured for pipelines, comprising:
   a vehicle body, wherein the vehicle body includes:
      a front body, wherein the front body includes a front movable part and a front base part;
      a back body;
      a joint connecting the back body to the front body;

a front turbine wheel and a steering axis coupled to the front body and the front turbine wheel;

a back turbine wheel and a steering axis coupled to the back body and the back turbine wheel;

a plurality of carrier racks connected to the vehicle body and extending radially outward from the vehicle body;

a plurality of inspection device carts, wherein a different one of the plurality of inspection device carts is attached radially at an outer end of each of the plurality of carrier racks; and a plurality of sensors coupled to each of the plurality of inspection device carts.

2. The inline inspection vehicle for pipelines of claim 1, wherein the vehicle body comprises:

a plurality of adjustable supporting struts with back-positioning rollers on the back body.

3. The inline inspection vehicle for pipelines of claim 2, further comprising:

an actuator that controls a speed of the front turbine wheel; and an actuator that controls a speed of the back turbine wheel.

4. The inspection vehicle for pipelines of claim 3, wherein each of the front turbine wheel and the back turbine wheel comprise: a plurality of blades extending radially outward from an outer axis: a driving gear mounted on an inner axis; a driven gear mounted on a bottom of each of the plurality of blades; and wherein the driving gear and the driven gear has a meshing position, in which the rotation of the driving gear drives the driven gear to rotate, such that each of the plurality of blades rotate about its respective longitudinal axis.

5. The self-adaptive inline inspection vehicle for pipelines of claim 4, wherein each of the plurality of blades of the front turbine wheel and the back turbine wheel comprise:

a vane;

a middle part; and a supporting strut.

6. The self-adaptive inline inspection vehicle for pipelines of claim 5, wherein when in a reduced size state, each of the plurality of blades is configured to incline clockwise approximately 1°-2° to abscissa, and the vane and middle part are configured to contract inward radially; and when in a full size state, each of the plurality of blades is configured to extend outward with its vane and middle part extended outward radially.

7. The self-adaptive inline inspection vehicle for pipelines of claim 6, wherein when in a first speed state, the front turbine wheel and the back turbine wheel adjust to a dish shape;

when in a second speed state, each of the plurality of blades are configured to rotate clockwise to an acute degree to abscissa, wherein the second speed state is slower than the first speed state; and when in a stopping or stopped state, each of the plurality of blades are configured to rotate clockwise approximately 90° to approximately perpendicular to abscissa; and when in a reverse state, each of the plurality of blades are configured to rotate clockwise to an obtuse degree to abscissa.

8. The inline inspection vehicle for pipelines of claim 7, further comprising, an adaptive controller; and a plurality of actuators, wherein the control system controls the plurality of actuators in response to an input of one or more sensors and configures the inline inspection vehicle to one of: the full size state or the reduced size state, and one of: the fast speed state, the slow speed state, the stop speed state, or the backward state.

9. The inline inspection vehicle for pipelines of claim 2, wherein the vehicle body comprises:

an outer cylinder including the front base part;

an inner cylinder including the front movable part, wherein at least a portion of the inner cylinder is configured to fit within the outer cylinder; and an actuator drive configured to move the inner cylinder forward or backward longitudinally within the outer cylinder to adjust a size of the plurality of carrier racks.

10. The inline inspection vehicle for pipelines of claim 9, wherein each of the plurality of carrier racks comprises:

a main strut;

an auxiliary strut; and a roller mounted at a lower end of at least one of one of the main strut or the auxiliary strut by a guiding track, wherein the roller is configured to move forward or backward longitudinally along the guiding track in response to movement of the inner cylinder.

11. The inline inspection vehicle for pipelines of claim 10, wherein when the carrier rack is in a radially contracted state, the roller that is mounted at the lower end of at least one of one of the main strut or the auxiliary strut is moved to a back position along the guiding track on the outer cylinder; and when the carrier rack is in a radially extended state, the roller that is mounted at the lower end of at least one of one of the main strut or the auxiliary strut is moved to the front position along the guiding track on the outer cylinder.

12. The inline inspection vehicle for pipelines of claim 10, wherein the plurality of carrier racks connected to the vehicle body and extending radially outward from the vehicle body are circularly and evenly arranged around the vehicle body, and wherein two neighbored carrier racks of the plurality of carrier racks are in different configurations: a first neighbored carrier rack in a backward configuration and a second neighbored carrier rack in a forward configuration.

13. He inline inspection vehicle for pipelines of claim 12, wherein the first neighbored carrier rack in a backward configuration includes:

the lower end of its main strut hinged to the inner cylinder; and the roller is mounted at the lower end of the auxiliary strut, wherein the roller is moved backward and forward along the guiding track on the outer cylinder.

14. The inline inspection vehicle for pipelines of claim 12, wherein the second neighbored carrier rack in the forward configuration includes:

the lower end of its auxiliary strut is hinged to the inner cylinder; and the roller is mounted at the lower end of the main strut, wherein the roller is moved backward and forward along the guiding track on the outer cylinder.

15. The inline inspection vehicle for pipelines of claim 9, wherein when the carrier rack is in a radially contracted state, the inner cylinder is extended relative to the outer cylinder; and when the carrier rack is in a radially extended state, the inner cylinder is retracted relative to the outer cylinder.

16. The inline inspection vehicle for pipelines of claim 1, further comprising:
    a head attached to the vehicle body, wherein the head includes at least one of:
        at least one sensor or a digital radiographic camera or a guided wave ultrasonic testing (GWUT) device.

17. The inline inspection vehicle for pipelines of claim 1, further comprising:
    one or more positioning rollers mounted on each of the plurality of inspection device carts, wherein the one or more positioning rollers are configured to interact with an inner wall of the pipelines for guidance of the inline inspection vehicle.

18. The inline inspection vehicle for pipelines of claim 1, wherein each of the plurality of inspection carts include:
    one or more sensors to detect one or more of: radial displacement, pressure, temperature, flows, and acoustics in the pipeline; and
    one or more devices for magnetic flux leakage (MFL) testing or ultrasound testing or electromagnetic acoustic transducer (EMAT).

19. An inline inspection vehicle configured for pipelines, comprising: a vehicle body, including: a front body, wherein the front body includes a front movable part and a front base part; and a back body; a plurality of carrier racks connected to the vehicle body and extending radially outward from the vehicle body; a plurality of inspection device carts, wherein a different one of the plurality of inspection device carts is attached radially at an outer end of each of the plurality of carrier racks, wherein each of the plurality of carrier racks comprises: a main strut, wherein a radial inner end of the main strut is connected to the vehicle body and a radial outer end of the main strut is connected to one of the plurality of inspection device carts; an auxiliary strut, wherein a radial inner end of the auxiliary strut is connected to the vehicle body and a radial outer end of the auxiliary strut is hinged to a middle position of the main strut; and wherein a lower end of at least one of the main strut and the auxiliary strut is configured to move in response to movement of the front movable part along a longitudinal direction; and a plurality of sensors are coupled to each of the plurality of inspection device carts.

20. An inline inspection vehicle configured for pipelines, comprising: a vehicle body, wherein the vehicle body includes: a front body, wherein the front body includes a front movable part and a front base part; and a back body; a front turbine wheel and a steering axis coupled to the front body and the front turbine wheel, wherein an actuator controls a speed of the front turbine wheel, wherein each of a plurality of blades of the front turbine wheel comprise a vane, a middle part, and a supporting strut, wherein when in a reduced size state, each of the plurality of blades is configured to incline clockwise approximately 1-2° to abscissa, and the vane and middle part are configured to contract inward radially, and when in a full size state, each of the plurality of blades is configured to extend outward with its vane and middle part extended outward radially: a plurality of carrier racks connected to the vehicle body and extending radially outward from the vehicle body; a plurality of inspection device carts, wherein a different one of the plurality of inspection device carts is attached radially at an outer end of each of the plurality of carrier racks; and a plurality of sensors coupled to each of the plurality of inspection device carts.

* * * * *